United States Patent [19]
Hargrave

[11] 3,960,364
[45] June 1, 1976

[54] HIGH PRESSURE TIGHT SHUTOFF VALVE SEAL

[75] Inventor: Michael E. Hargrave, Union Grove Lake, Iowa

[73] Assignee: Fisher Controls Company, Marshalltown, Iowa

[22] Filed: Aug. 1, 1974

[21] Appl. No.: 494,012

[52] U.S. Cl. .............................. 251/210; 251/332
[51] Int. Cl.² ......................................... F16K 25/00
[58] Field of Search ............................ 251/322, 210

[56] References Cited
UNITED STATES PATENTS

| | | | |
|---|---|---|---|
| 2,830,620 | 4/1958 | Shuptrine | 251/210 X |
| 2,885,176 | 5/1959 | Bryant | 251/332 X |
| 3,327,991 | 6/1967 | Wallace | 251/332 X |

FOREIGN PATENTS OR APPLICATIONS

| | | | |
|---|---|---|---|
| 862,536 | 3/1961 | United Kingdom | 251/210 |

Primary Examiner—Arnold Rosenthal
Attorney, Agent, or Firm—James C. Bolding

[57] ABSTRACT

A tight shutoff valve seal is disclosed, wherein an easily deformable annular valve seal member is retained within an annular groove in a valve element. Protecting this seal member from erosion or damage by a fluid flowing therepast is a slidable seal retaining member which additionally retains the seal member within the groove. The retaining member is resiliently urged to a seal-protecting position when a valve employing this seal is opened, and when the valve is closed the retaining member slides on a surface of the seal member and on a surface of the valve element to allow the seal member to abut and seal against a valve seating surface.

6 Claims, 4 Drawing Figures

HIGH PRESSURE TIGHT SHUTOFF VALVE SEAL

BACKGROUND OF THE INVENTION

1. Field of the Invention

In fluid systems, particularly high pressure fluid system, it is frequently desirable to employ a control valve which is, and will remain, substantially leakproof despite erosion of metal surfaces, corrosion, and the presence of particulate matter in the contained fluid. Conventional metal-to-metal valve seats may initially be leakproof, but under the influence of such erosion, corrosion, and similar damage to valve seating surfaces they quickly begin to leak when closed and require repair or replacement. This invention provides a solution to the problems encountered when such conventional valves are employed.

2. Description of the Prior Art

Prior art valves having soft nonmetallic seating surfaces are typified by those disclosed in U.S. Pat. No. 2,060,748 to Roberts et al., U.S. Pat. No. 3,327,991 to Wallace, U.S. Pat. No. 3,410,524 Self, and 3,809,362 to Baumann. In each of the valve seat arrangements disclosed by these references, a soft polymeric or elastomeric seat ring, which is generally annular in shape, is partially confined in an annular space surrounding a valve inlet passageway. This annular space is bounded in the radially outer direction by the valve body, and in the radially inner direction by a sleeve member which is slidable in the valve inlet passageway to compress and deform the annular seal ring. The seating surface of the prior art seal ring is, or becomes upon axial movement of the sleeve member, exposed for contact with the seating surface of a valve plug member, a portion of the valve plug member serving as a piston which engages and moves the sleeve member axially to effect compression of the resilient seal ring as the valve plug member is moved to a valve-closing position.

In these prior art valves it is the resilience of the deformable seal ring which provides the force to restore the sleeve member to its original position when the valve is reopened. For this reason, the sleeve member may not always be returned to the same position each time the valve is opened or closed, inasmuch as the original volume, shape, or resiliency of the seal ring may be substantially altered through use. For example, the seal ring may cold-flow if manufactured of a fluorocarbon polymer such as polytetrafluoroethylene. Moreover, in these prior art seals the seal ring commonly extends a substantial distance in the direction of the axis of the valve inlet passageway so that changes in temperature of the fluid flowing through the valve may result in significant thermal expansion or contraction of the seal ring which is detrimental to valve performance.

BRIEF SUMMARY OF THE INVENTION

It is an object of this invention to provide a soft valve seal arrangement wherein the soft valve seal ring is protected from erosion or damage by a fluid flowing through the valve and in which the sleeve member affording such protection is consistently returned to the same position when the valve is opened.

A further object of the invention is to provide a valve seal which does not undergo substantial dimensional changes in use, such as those caused by variations in the temperature of a fluid flowing through the valve.

A still further object of this invention is to provide a valve seal arrangement which requires a lower valve actuator force in order to close the valve and achieve tight shutoff than the actuator forces required in prior art valves.

Yet another object is to provide a soft seal for a valve which is protected against damage caused by excessive actuator closing forces and which is completely confined when the valve is in a closed position to prevent extrusion and premature failure of the soft seal member.

To achieve these objects, as well as other objects which will become apparent, I provide a generally annular valve seal member, which may be a polyhalocarbon or other deformable material, retained in an annular recess in the wall of a first valve element. The wall of this element, which may be a valve plug member or an inlet or outlet passageway, is formed in such a way that an annular portion of the valve seal member is exposed when viewed from the direction of an annular valve seating surface located on a second valve element while the valve seal member is supported by the annular groove and a containment member against movement away from the second valve element. Slidingly retained on the first element, and extending toward the second element, is a generally cylindrical annular seal containment member which retains the seal member in its annular recess and which is resiliently urged in the direction of the second element. One of the valve members is moveable within the valve body cavity toward and away from the other, and closing of the valve is effected by movement of the two members into an abutting relationship, sliding the containment member on the surface of the first valve member and allowing the exposed annular portion of the annular valve seal member to seal against the seating surface, while the containment member contains portions of the seal to prevent undesirable extrusion thereof. When the valve is opened, the seal containment member is urged toward the second valve member to confine and protect the valve seal member.

DESCRIPTION OF THE DRAWINGS

Reference is now made to the drawings, wherein like numbers are used to designate corresponding parts throughout the several views, in which.

DESCRIPTION OF THE PREFERRED EMBODIMENTS

Figure 1A:
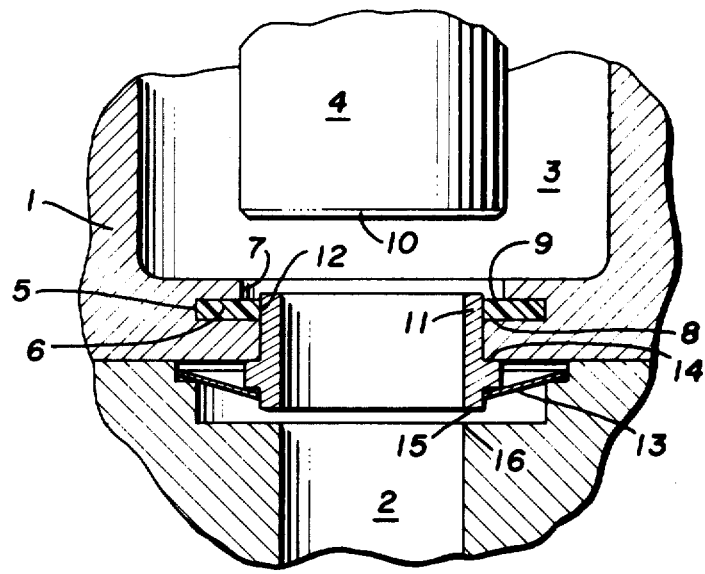
FIG. 1a is a cross-sectional view of a position of a valve employing one embodiment of my invention, shown in an open position.
Figure 1B:
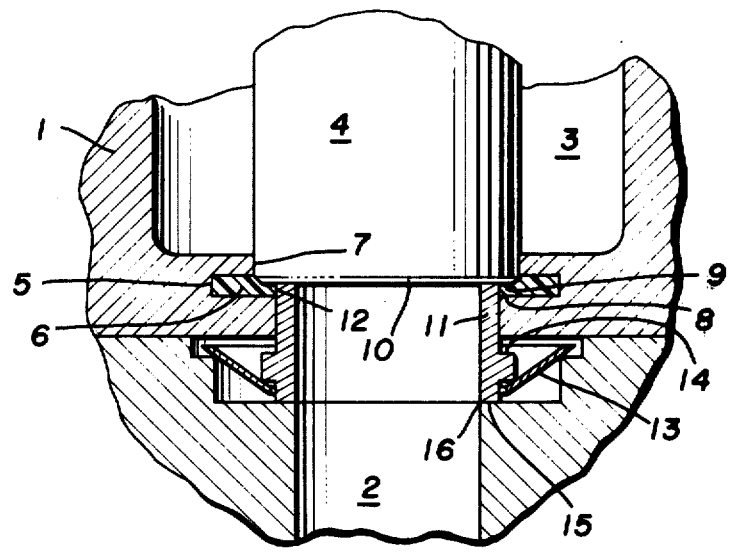
FIG. 1b is a cross-sectional view of the valve of FIG. 1a, shown in a closed position.

Referring now to FIGS. 1a and 1b, there is shown a valve body, generally designated 1, having an inlet passageway 2, a valve body cavity 3, and outlet passageway (not here shown), and a valve plug member 4 movable by suitable valve actuator means (not here shown) within the body cavity 3, toward and away from the passageway 2. An annular recess 5 is provided in the wall of the passageway 2. Retained in the annular recess 5 is an annular valve seal member 6 of deformable material, for example a halocarbon polymer, which is chemically and physically resistant to the material desired to be flowed through the valve. A portion 7 of the valve inlet passageway 2 between the annular seal member 6 and the valve body cavity 3 is of a greater diameter than the portion of the inlet passageway 2 immediately upstream of the seal member 6, and the inner diameter of the annular seal member 6 is approximately the same as that of the passageway 2 immediately upstream of the seal member. The annular seal member 6 is thus supported on the side away from the body cavity 3 by a surface 8 of the annular recess 5, while an annular portion 9 of the seal member 6 is exposed when viewed from within the valve body cavity. This exposed annular portion 9 of the seal member is engaged by a sealing surface 10 of the valve plug member 4 upon movement of the plug to a valve-closing position, as shown in FIG. 1b.

Retained within the inlet passageway 2 upstream of the seal member 6 and in sliding contact therewith, is a generally cylindrical tubular seal containment member 11, the wall of which extends through the generally circular opening 12 in the seal member 6. A spring member 13 is provided which urges the seal containment member 11 toward the valve body cavity 3, the spring member 13 being here shown as a Bellevilletype spring. When the seal containment member 11 is in the valve open position shown in FIG. 1a., it will be observed that the seal member 6 is protected thereby from damage or loss caused by high velocity fluid flowing through the inlet passageway. The seal containment member 11 may be retained within the inlet passageway 2 in any convenient manner, but in the embodiment here shown retaining lip 14 is employed.

Referring now to FIG. 1b, in which the valve is shown in a closed position, it is seen that the end 15 of the seal containment member 11 cooperates with the surface 16 on the periphery of the inlet passageway 2 to limit the axial movement of the containment member. By limiting this movement, excessive deformation or damage to the valve seal member 6 by the valve plug member 4 may be prevented, and the seal member is protected against damage caused by excessive valve actuator closing forces. Moreover, it is seen that the seal member 6 is completely contained by the annular recess 5 in the passageway 2, the containment member 11, and the sealing surface 10 of the valve plug member 4 when the valve is in a closed position. By virtue of this complete containment, extrusion or cold-flowing of the seal member 6 is prevented and the useful life thereof is prolonged.

It will be apparent that the spring member 13 may be selected to exert any desired spring force to urge the containment member 11 in the direction of the valve body cavity 3. However, I prefer to employ a spring member which exerts a relatively small force, inasmuch as the use of such a spring results in low valve actuator closing force requirements. This feature represents a substantial improvement over prior art soft valve seal arrangement, in which the valve plug must typically exert sufficient force on a seal containment member to cause the seal member to deform or compress to a substantial degree. In such prior art seals, the resilient force urging the containment member in the direction of the valve body cavity has been supplied by the compression or distortion of the seal member itself, and relatively large forces must be supplied by a valve actuator to overcome this resilient force of the seal member. Moreover, the resiliency of such prior art seals may vary with temperature, or because the seal material cold flows. In addition, in a valve seal constructed according to my invention it will be understood that the annular seal member 6 may be constructed of a soft deformable metal, such as lead, silver, or the like, for use in a valve designed for high-temperature service. Although I prefer to employ a seal member of a polymeric material for low or moderate temperature use, clearly the seal member of my invention need only be formed of a material softer than the seating surface 10 of the valve plug member 4 and need not be resilient in order to practice this invention, inasmuch as the seal member 6 is not relied on to provide resilience to urge the containment member 11 in the direction of the valve body cavity 3 as was the case with prior art soft seals.

It will be understood by one skilled in the art that the use of a dislike annular seal member presents certain advantages over the prior art seal members. Where the temperature of the fluid flowing through a valve may be expected to vary, thermal expansion or contraction may significantly affect the volume of the seal member. Where seals of the prior art type are employed, this expansion or contraction of the seal member may significantly change the position of the valve sealing surfaces. The valve seal assembly of my invention, on the other hand, permits the use of a relatively thin annular seal member, which minimizes changes in the location of the valve sealing surface.

Figure 2:
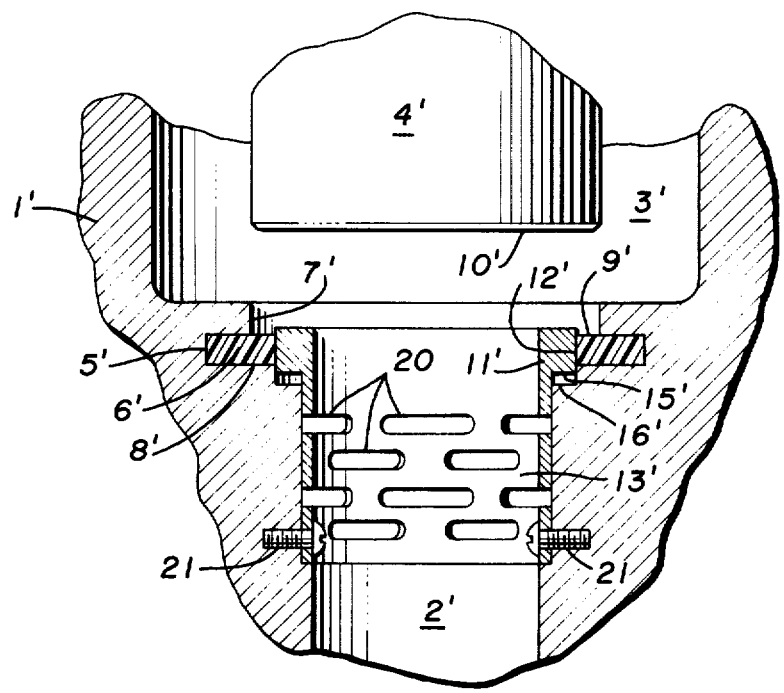
FIG. 2 is a cross-sectional view of the inlet portion of a valve equipped with an alternative embodiment of this invention.

Turning now to FIG. 2, there is shown an alternative embodiment of the instant invention, wherein a portion of the seal containment member 11' is employed as the spring member 13'. A set of slots 20 is formed in the wall of the containment member 11', the portion of the wall between these slots 20 having sufficient resiliency to compress when the valve plug member 4' is moved to a valve-closing position. In this embodiment the containment member is shown retained within the valve inlet passageway 2' by a set of screws 21. The axial movement of the containment member 11' is limited by a lip 15' on the outer surface of the containment member, which moves to abut a lip 16' on the wall of the valve inlet passageway 2' upon closure of the valve.

Figure 3:
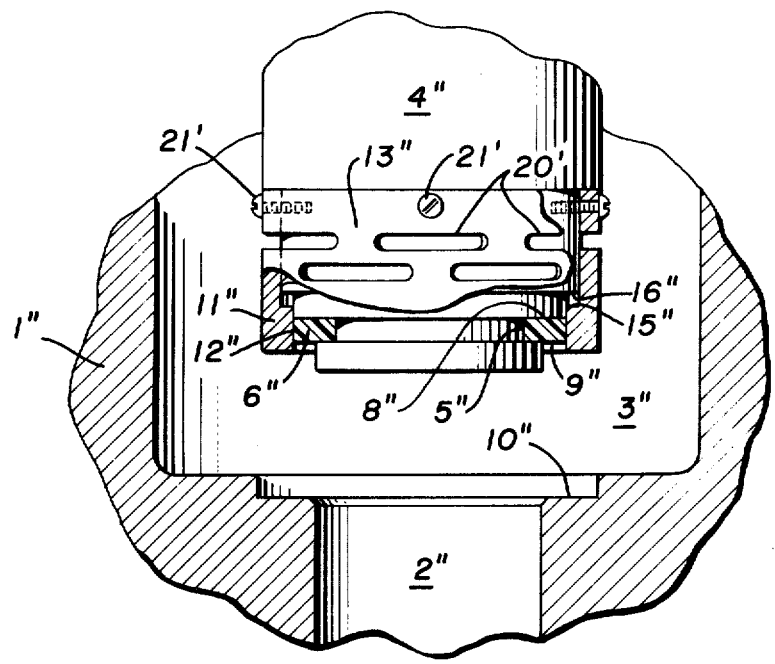
FIG. 3 is a cross-section view of an embodiment of my invention wherein the valve seal member is carried on the valve plug member.

Referring to FIG. 3, there is shown an embodiment of my invention wherein the valve seal member 6'', the seal containment member 11'', and the spring member 13'' are carried on a moveable valve plug member 4'' located in a valve body cavity 3''. In the embodiment here shown, the end of the valve plug member 4'' is provided with a reduceddiameter portion and an annular groove 5'', in which the seal member 6'' is received. The seal retaining member 11'' is retained in sliding contact with the plug member 4'' and the outer periphery of the seal member 6'', and is resiliently biased in the direction of a passageway 2'' communicating between the exterior of the valve and the valve body cavity 3'' by a spring member 13''. As here shown, the containment member 11'' and the spring member 13'' are constructed as a single piece and retained on the plug 4'' by a set of screws 21'. As in the previously described embodiments of my invention, a lip 15'' is provided on the seal containment member to coact with a surface 16'' on the valve plug member 4'' to limit the axial sliding movement of the containment member and thereby prevent damage to the seal member 6'' when the plug is moved to a valve-closing position. An annular seating surface 10'' is provided surrounding the passageway 2", and upon movement of the valve plug to a closed position, a first portion of this seating surface abuts the containment member 11", compressing the spring 13", and allows an exposed annular surface 9" of the seal member 6" to seal against a second portion of the seating surface 10".

Obviously, many modifications and variations to the valve seal arrangement described herein will occur to those skilled in the art in the light of the above teachings. For example, although I have described preferred embodiments wherein my seal is employed in the inlet portion of a valve, clearly this arrangement may be employed equally well in the outlet passageway of a valve. It is therefore to be understood that my invention may be practiced otherwise than as herein specially described.

I claim:

1. A tight-shutoff valve seal, comprising:

a deformable seal member having an inner periphery, an outer periphery, and first and second generally annular faces, said second face having first and second concentric portions;

a first valve member including an annular groove and a cylindrical surface adjacent said groove, said groove receiving said seal member and having faces abutting one of said peripheries, said first face, and said first portion of said second face of said seal member, and said cylindrical surface being of substantially the same diameter as the other of said peripheries of said seal member;

a seal retaining member having a first surface slidable on said cylindrical surface of said first valve member and on the other of said peripheries of said seal member, and enclosing said other periphery and having a second surface perpendicular to said first surface;

a second valve member having an annular surface facing toward said second portion of said second face of said seal member and said second surface of said retaining member;

resilient means for biasing said retaining member toward said second valve member; and mechanical stop means on said retaining member for abutting a portion of said first valve member after said retaining member slides a predetermined distance on said first valve member to prevent excessive deformation and damage to said seal member, one of said first and second valve members being moveable toward the other of said valve members to a valve-closing position, wherein said second surface of said retaining member abuts said annular surface of said second valve member, said retaining member slides on said first valve member compressing said resilient means, and said second portion of said second face of said seal member sealingly engages said annular surface of said second valve member.

2. A valve seal as defined in claim 1, wherein said first valve member is a portion of a valve body surrounding a passageway from an interior cavity in said body to the exterior of said body and said second valve member is a reciprocable valve plug member.

3. A valve seal as defined in claim 1, wherein said first valve member is a portion of a reciprocable valve plug member, and said second valve member is a portion of a valve body surrounding a passageway from an interior cavity in said body to the exterior of said body.

4. The valve seal structure as defined in claim 2, wherein said resilient means is a Belleville spring.

5. In a valve having a valve body, a central cavity within said body, and an inlet passageway and an outlet passageway communicating with said cavity, a tight shutoff valve seal which comprises:

a deformable seal member retained in the periphery of one of said passageways, said seal member having a first surface facing toward said central cavity, a second surface facing away from said central cavity way, and a radially inward surface, a generally annular seal containment member retained within said one passageway and having an outer surface in sliding contact with a portion of said one passageway and said radially inward surface of said seal member, mechanical stop means on said seal containment member for limiting sliding travel of said member with respect to said passageway and said seal member to a predetermined amount, and preventing excessive deformation and damage to said seal member, resilient means for exerting a force to urge said containment member in the direction of said central cavity, support means for substantially preventing movement of said second surface of said seal member away from said central cavity, and valve closure means moveable within said central cavity toward said one passageway for engaging said containment member, overcoming said force of said resilient means to move said containment member away from said central cavity, and seating against a portion of said first surface of said seal member to seal said valve against flow of a fluid therethrough.

6. The valve seal structure as defined in claim 5, wherein said resilient means is a Belleville spring.

* * * * *